United States Patent
Li et al.

(10) Patent No.: US 12,231,800 B2
(45) Date of Patent: Feb. 18, 2025

(54) METHOD AND DEVICE OF IMAGE PROCESSING, IMAGING SYSTEM AND STORAGE MEDIUM

(71) Applicant: SZ DJI TECHNOLOGY CO., LTD., Shenzhen (CN)

(72) Inventors: Bing Li, Shenzhen (CN); Wen Zou, Shenzhen (CN); Fangpei Yang, Shenzhen (CN); Guangyuan Lin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/683,196

(22) Filed: Feb. 28, 2022

(65) Prior Publication Data

US 2022/0232173 A1    Jul. 21, 2022

Related U.S. Application Data

(63) Continuation of application No. PCT/CN2019/112429, filed on Oct. 22, 2019.

(51) Int. Cl.
*H04N 5/77* (2006.01)
*G06T 5/80* (2024.01)
*H04N 5/262* (2006.01)

(52) U.S. Cl.
CPC ............. *H04N 5/2628* (2013.01); *G06T 5/80* (2024.01); *H04N 5/77* (2013.01);
(Continued)

(58) Field of Classification Search
CPC ........ H04N 5/2628; H04N 5/77; G06T 5/006; G06T 2207/10016; G06T 2207/20132; G06T 2207/30241

See application file for complete search history.

(56) References Cited

U.S. PATENT DOCUMENTS

| | | | | |
|---|---|---|---|---|
| 6,317,151 | B1 * | 11/2001 | Ohsuga | A63F 13/213 |
| | | | | 348/169 |
| 9,992,449 | B1 * | 6/2018 | Ashkenazi | H04N 5/2628 |

(Continued)

FOREIGN PATENT DOCUMENTS

| | | |
|---|---|---|
| CN | 103377488 A | 10/2013 |
| CN | 103488975 A | 1/2014 |
| CN | 104170370 A | 11/2014 |
| CN | 104885441 A | 9/2015 |
| CN | 105210379 A | 12/2015 |
| CN | 105844256 A | 8/2016 |
| CN | 106780344 A | 5/2017 |
| CN | 107431762 A | 12/2017 |

(Continued)

OTHER PUBLICATIONS

International Search Report of PCT/CN2019/112429 (Jul. 16, 2020).

*Primary Examiner* — Thai Q Tran
*Assistant Examiner* — Jose M Mesa
(74) *Attorney, Agent, or Firm* — FIDELI LAW PLLC

(57) ABSTRACT

A method and a device for image processing, an imaging system, and a storage medium are provided. The method includes: obtaining an initial video shot by a photographing apparatus at a fixed angle of view, where the initial video includes a plurality of frames of images; cropping, based on a preset trajectory, the plurality of frames of images in the initial video; and combining the cropped plurality of frames of images to obtain a target video. In this way, a video with a smoothly moving field of view may be obtained based on a video shot at a fixed angle of view, thereby improving a user's shooting experience.

20 Claims, 5 Drawing Sheets

(52) U.S. Cl.
CPC .............. *G06T 2207/10016* (2013.01); *G06T 2207/20132* (2013.01); *G06T 2207/30241* (2013.01)

(56) References Cited

U.S. PATENT DOCUMENTS

| | | | |
|---|---|---|---|
| 2013/0215221 A1* | 8/2013 | Wang | G06T 7/00 |
| | | | 348/43 |
| 2019/0137620 A1* | 5/2019 | Cappelletti | G01S 13/886 |
| 2020/0234413 A1* | 7/2020 | Park | G06T 15/205 |
| 2021/0110599 A1* | 4/2021 | Fang | G06T 7/55 |

FOREIGN PATENT DOCUMENTS

| | | | |
|---|---|---|---|
| CN | 108780581 A | 11/2018 | |
| CN | 108876717 A | 11/2018 | |
| CN | 109005334 A | 12/2018 | |
| CN | 109104562 A | 12/2018 | |
| CN | 109257559 A | 1/2019 | |
| CN | 109547743 A | 3/2019 | |
| CN | 110189378 A | 8/2019 | |
| JP | 2010057069 A | 3/2010 | |
| JP | 2013239986 A | 11/2013 | |
| WO | 2012081210 A1 | 6/2012 | |

* cited by examiner

METHOD AND DEVICE OF IMAGE PROCESSING, IMAGING SYSTEM AND STORAGE MEDIUM

RELATED APPLICATIONS

This application is a continuation application of PCT application No. PCT/CN2019/112429, filed on Oct. 22, 2019, and the content of which is incorporated herein by reference in its entirety.

TECHNICAL FIELD

The present disclosure relates to the technical field of image processing, and specifically, a method and device of image processing, an imaging system, and a storage medium.

BACKGROUND

Conventional photographing apparatus may be disposed on a gimbal or other stabilization devices to realize stable shooting of videos. However, for an imaging system that does not have a stabilization device such as a gimbal, it is often difficult to obtain a video with a smoothly moving field of view, thus compromising a user's shooting experience.

BRIEF SUMMARY

Some exemplary embodiments of the present disclosure provide a method and device of image processing, an imaging system and a storage medium, a video with a smoothly moving field of view may be obtained from a video shot at a fixed angle of view, which improves a user's shooting experience.

According to a first aspect, some exemplary embodiments of the present disclosure provide an image processing method, including: obtaining an initial video including a plurality of frames of images shot by a photographing apparatus at a fixed angle of view; cropping, based on a preset trajectory, the plurality of frames of images to obtain a plurality of cropped images; and obtaining a target video based on the plurality of cropped images.

According to a second aspect, some exemplary embodiments of the present disclosure provide an image processing device, including at least one storage medium storing a set of instructions for image processing; and at least one processor in communication with the at least one storage medium, where during operation, the at least one processor executes the set of instructions to: obtain an initial video including a plurality of frames of images shot by a photographing apparatus at a fixed angle of view, crop, based on a preset trajectory, the plurality of frames of images to obtain a plurality of cropped images, and obtain a target video based on the plurality of cropped images.

According to a third aspect, some exemplary embodiments of the present disclosure provide an imaging system, including: a photographing apparatus; and an image processing device, including: at least one storage medium storing a set of instructions for image processing, and at least one processor in communication with the at least one storage medium, where during operation, the at least one processor executes the set of instructions to: obtain an initial video including a plurality of frames of images shot by a photographing apparatus at a fixed angle of view, crop, based on a preset trajectory, the plurality of frames of images to obtain a plurality of cropped images, and obtain a target video based on the plurality of cropped images.

According to a fourth aspect, some exemplary embodiments of the present disclosure provide a computer readable storage medium, including: a set of instructions for image processing, where when being executed by at least one processor, the set of instructions direct the at least one processor to perform: obtaining an initial video including a plurality of frames of images shot by a photographing apparatus at a fixed angle of view, cropping, based on a preset trajectory, the plurality of frames of images to obtain a plurality of cropped images, and obtaining a target video based on the plurality of cropped images.

Some exemplary embodiments of the present disclosure may obtain an initial video shot by a photographing apparatus at a fixed angle of view, the initial video may include a plurality of frames of images, and may crop, based on a preset trajectory, a plurality of frames of images in the initial video, to stitch the cropped plurality of frames of images to obtain a target video. Through the present embodiments, a target video with a smoothly moving field of view along a preset trajectory may be obtained from an initial video shot at a fixed angle of view, improving a user's shooting experience.

BRIEF DESCRIPTION OF THE DRAWINGS

To clearly describe the technical solutions in the embodiments of the present disclosure, the following briefly describes the accompanying drawings required for describing some exemplary embodiments. Apparently, the accompanying drawings in the following description show merely some exemplary embodiments of the present disclosure, and a person of ordinary skill in the art may still derive other drawings from these accompanying drawings without creative efforts.

DETAILED DESCRIPTION

Figure 1:
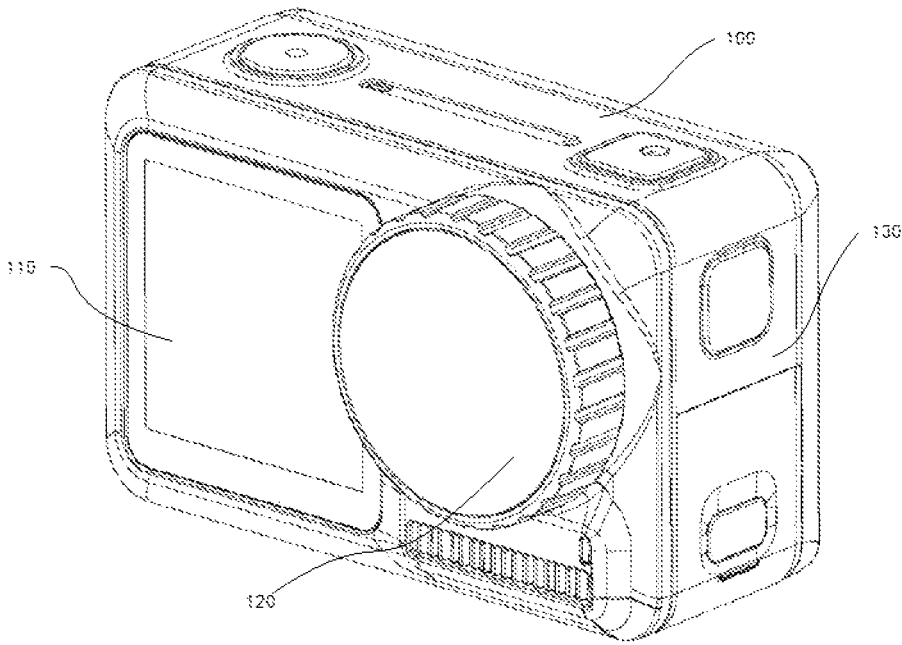
FIG. 1 is a schematic structural diagram of an imaging system according to some exemplary embodiments of the present disclosure.

The following describes the technical solutions in some exemplary embodiments of the present disclosure with reference to the accompanying drawings. Apparently, the described exemplary embodiments are merely some but not all the embodiments of the present disclosure. All other embodiments obtained by a person of ordinary skill in the art based on the embodiments of the present disclosure without creative efforts shall fall within the scope of protection of the present disclosure.

The following describes in detail some exemplary embodiments of the present disclosure with reference to the accompanying drawings. In absence of conflicts, the following embodiments and features in the embodiments may be combined.

Time-lapse photography is a time compressed photography technology. After a set of photos or a video(s) have been shot, a process of several minutes, several hours, several days, or even several years may be compressed into a relatively short period of time by way of connecting the photos or extracting video frames, and then played as a video. In a time-lapse photographing video, the slow change of an object or a scene is compressed into a short period of time, presenting a strange and wonderful scene that is usually unseeable by a naked eye. Time-lapse photography is usually used to shoot objects of urban scenery, natural scenery, astronomical phenomena, urban life, architectural construction, biological evolution, and other subjects.

At present, time-lapse photography is mainly divided into time-lapse photography in which the angle of view of a photographing apparatus remains unchanged, and motion time-lapse photography in which the angle of view of a photographing apparatus changes. When a photographing apparatus is provided on a stabilization device such as a gimbal, stable motion time-lapse shooting may be achieved. However, for an imaging system that does not have a stabilization device such as a gimbal, it is often difficult to obtain a time-lapse photography with smoothly moving field of view, which compromises a user's shooting experience.

Some exemplary embodiments of the present disclosure provide an imaging system that may obtain a target video (for example, a motion time-lapse video) with a smoothly moving field of view along a preset trajectory from an initial video shot at a fixed angle of view, so as to improve a user's shooting experience.

The image processing method provided in some exemplary embodiments of the present disclosure may be executed by an imaging system, where the imaging system may include a photographing apparatus and an image processing device, in some exemplary embodiments, the photographing apparatus may be integrated with the image processing device; in some exemplary embodiments, the photographing apparatus may be spatially independent of the image processing device. The photographing apparatus and the image processing device may establish a communication in a wired or wireless manner.

An imaging system provided in some exemplary embodiments of the present disclosure will be schematically described below with reference to FIG. 1.

Referring to FIG. 1, a sports camera is taken as an example for illustrative purposes in some exemplary embodiments. The sports camera 100 may include a touch screen 110, a camera 120 and a housing 130; the housing 130 of the sports camera 100 is usually a sealed waterproof housing, and an image processing device (not shown in the figure) is disposed in an accommodating chamber of the housing 130.

A user may obtain an initial video at a fixed angle of view by holding the sports camera 100 or placing the sports camera 100 in a fixed position, it should be understood that the fixed angle of view in the embodiments of the present disclosure refers to the angle of view of the photographing apparatus remains the same or changes within a small range during the process of shooting an initial video. The initial video may include a plurality of frames of images, the image processing device may obtain the plurality of frames of images from the initial video and crop based on a preset trajectory, and may stitch the cropped plurality of frames of images, so as to obtain a target video. Through some exemplary embodiments, a target video with smoothly moving field of view along the preset trajectory may be obtained from the initial video shot at the fixed angle of view, thereby improving the user's shooting experience.

An image processing method provided in some exemplary embodiments of the present disclosure will be schematically described below with reference to the accompanying drawings.

Figure 2:
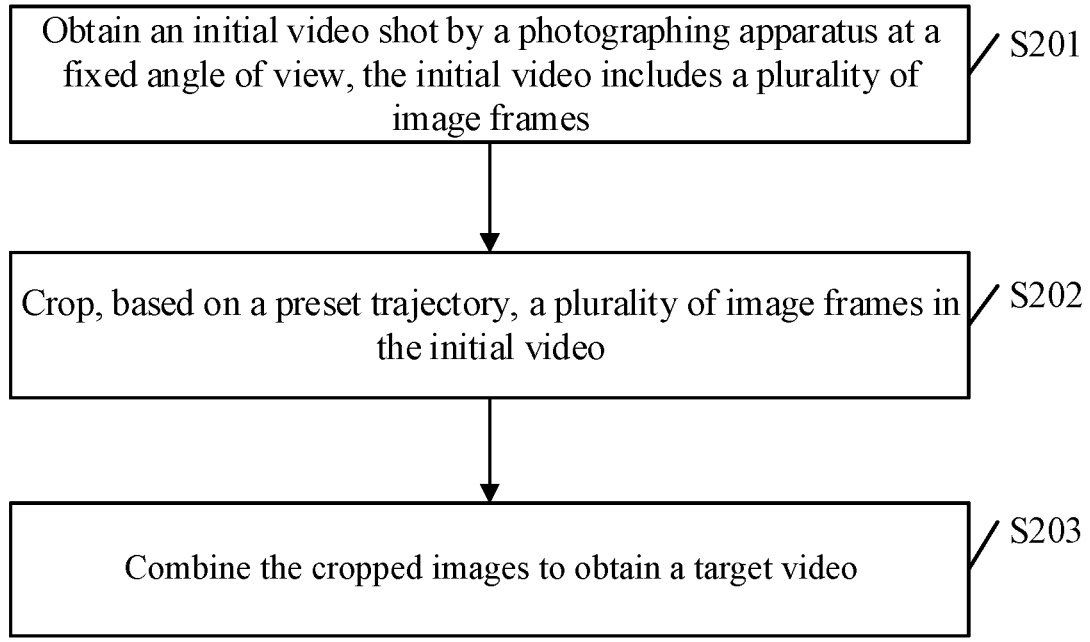
FIG. 2 is a schematic flowchart of an image processing method according to some exemplary embodiments of the present disclosure.

Specifically, referring to FIG. 2, which is a schematic flowchart of an image processing method according to some exemplary embodiments of the present disclosure, the method may be executed by an image processing device, where the detailed illustration of the image processing device is described above. Specifically, the method provided in some exemplary embodiments may include following steps.

S201, Obtain an initial video shot by a photographing apparatus at a fixed angle of view, where the initial video may include a plurality of frames of images.

In some exemplary embodiments of the present disclosure, an image processing device may obtain an initial video shot by a photographing apparatus at a fixed angle of view, and the initial video may include a plurality of frames of images. In some exemplary embodiments, the fixed angle of view may be any angle of view preset before a video is shot by a photographing apparatus. In some exemplary embodiments, the photographing apparatus may include, but is not limited to, a sports camera, a panoramic camera, a fisheye camera, and the like. In some exemplary embodiments, the number of the photographing apparatus may be one or more, when the number is more than one, the plurality of photographing apparatus may be installed in different positions on a mobile platform to obtain a relatively wide angle of view, and correspondingly, an initial video corresponds to a relatively wide angle of view. In some exemplary embodiments, the mobile platform may be an unmanned aerial vehicle, an unmanned vehicle, a handheld device, or the like.

Figure 3:
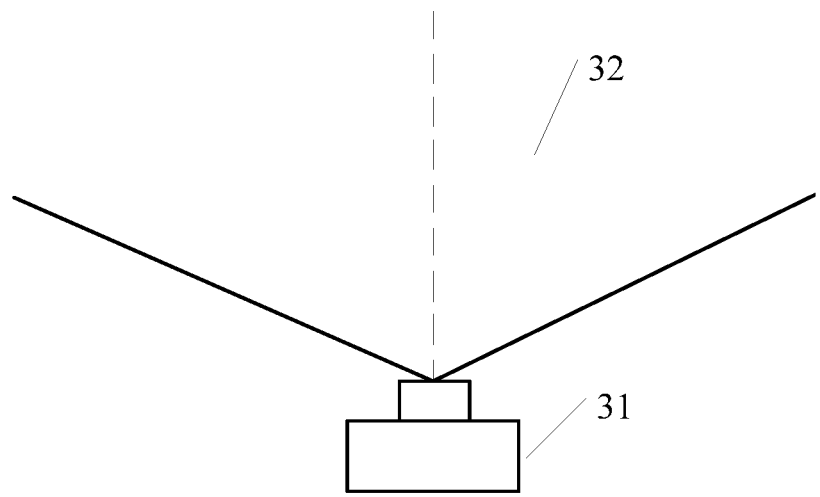
FIG. 3 is a schematic diagram of shooting at a fixed angle of view according to some exemplary embodiments of the present disclosure.

Specifically, FIG. 3 may be taken as an example for illustrative purposes, FIG. 3 is a schematic diagram of shooting at a fixed angle of view according to some exemplary embodiments of the present disclosure, as shown in FIG. 3, if a photographing apparatus 31 is at a fixed angle of view 32, an image processing device may obtain an initial video shot by the photographing apparatus 31 at the fixed angle of view 32, where the initial video may include a plurality of frames of images. Specifically, FIG. 4a may be taken as an example, which is a schematic diagram of a plurality of frames of images shot at a fixed angle of view provided in some exemplary embodiments of the present disclosure.

S202, Crop, based on a preset trajectory, the plurality of frames of images in the initial video.

In some exemplary embodiments of the present disclosure, an image processing device may crop, based on a preset trajectory, the plurality of frames of images in the initial video.

In some exemplary embodiments, the preset trajectory may include any one or more of straight lines, curves, and marked dots. In some exemplary embodiments, the preset trajectory may be a straight line or a curve in any direction, for example, the preset trajectory may be a straight line in a horizontal direction, or a straight line perpendicular to a horizontal direction, or a plurality of discrete mark points. For example, the preset trajectory may be input by a user through the touch screen 110 as shown in FIG. 1.

In some exemplary embodiments, an image processing device may directly crop, based on a preset trajectory, the plurality of frames of images in the initial video. In some exemplary embodiments, the field of view corresponding to each cropped frame of image may be different.

Figure 4A:
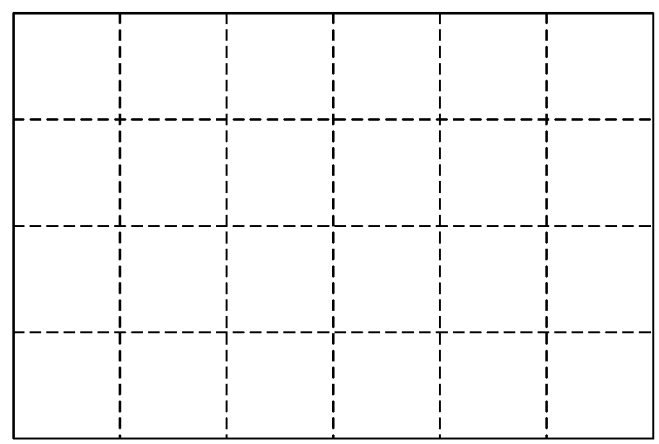
FIG. 4a is a schematic diagram image frame(s) shot at a fixed angle of view according to some exemplary embodiments of the present disclosure.
Figure 4B:
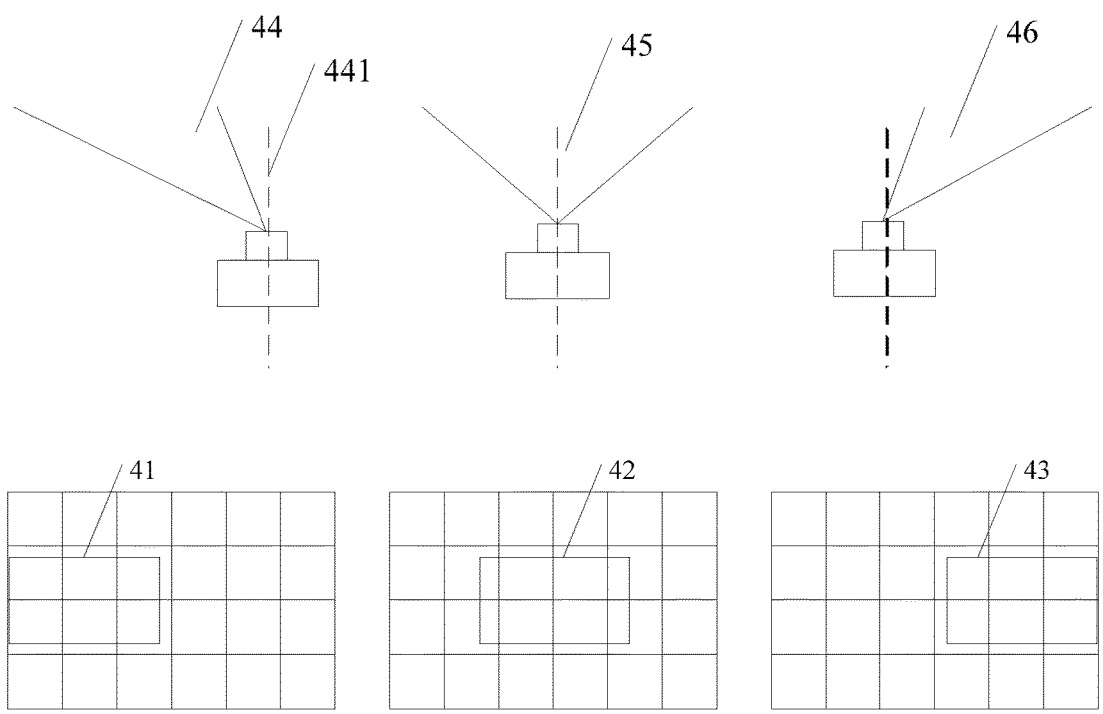
FIG. 4b is a schematic diagram of cropping an image frame(s) according to some exemplary embodiments of the present disclosure.

Taking FIG. 4b as an example, which is a schematic diagram of cropping a plurality of frames of images according to some exemplary embodiments of the present disclosure, as shown in FIG. 4b, after obtaining an initial video, an image processing device may crop a plurality of frames of images in the initial video based on a preset trajectory such as a straight line in the horizontal direction, to obtain a plurality of frames of images in a region 41, a region 42 and a region 43 shown in FIG. 4b, where the plurality of frames of images in the region 41 corresponds to an angle of view 44, the plurality of frames of images in the region 42 corresponds to an angle of view 45, the plurality of frames of images in the region 43 corresponds to an angle of view 46, where the angle of view 44, the angle of view 45, and the angle of view 46 are different angles of view in the horizontal direction.

In some exemplary embodiments, prior to the cropping, based on a preset trajectory, of the plurality of frames of images, an image processing device may convert the fixed angle of view based on the preset trajectory, to obtain a plurality of converted frames of images after conversion, and may crop, based on the preset trajectory, the converted plurality of frames of images. In some exemplary embodiments, the angle of view corresponding to the converted plurality of frames of images may be different from the fixed angle of view. In some exemplary embodiments, the angle of view corresponding to each of the converted plurality of frames of images may be different.

In some exemplary embodiments, the preset trajectory may be a straight line in a horizontal direction, an image processing device may smoothly convert a fixed angle of view based on the straight line in the horizontal direction, and may obtain a plurality of frames of images at different angles of view during the process of conversion, and may crop the plurality of frames of images in different angles of view.

In some exemplary embodiments, the preset trajectory may be a plurality of mark points in a horizontal direction, an image processing device may smoothly convert a fixed angle of view based on the plurality of mark points in the horizontal direction, and may obtain a plurality of frames of images in different angles of view corresponding to different plurality of mark points during the process of conversion, and may crop the plurality of frames of images in different angles of view.

When cropping an image by the method shown in FIG. 4b, angles of view corresponding to cropped image regions may not be centered on an optical axis of the photographing apparatus, for example, an angle of view 44 corresponding to a region 41 is not centered on an optical axis 441, which may lead to visual distortions in the image region 41. Through the method of converting the angle of view of the plurality of frames of images prior to cropping, and cropping the plurality of frames of images after angle conversion, the visual distortion may be eliminated. This can more effectively simulates the shooting effect of angle conversion of the photographing apparatus, thereby improving the quality and stability of the target video.

In some exemplary embodiments, when converting the fixed angle of view based on the preset trajectory, an image processing device may determine, based on the preset trajectory, a conversion angle corresponding to each of the plurality of frames of images, and may convert the fixed angle of view based on these conversion angles.

In some exemplary embodiments, an image processing device may determine, based on a preset trajectory, respective conversion angles corresponding to the plurality of frames of images, and may convert the fixed angle of view based on the conversion angle(s). In some exemplary embodiments, the conversion angle(s) may be any preset angle of view of a photographing apparatus, the present disclosure does not make specific limitations on it.

Figure 5:
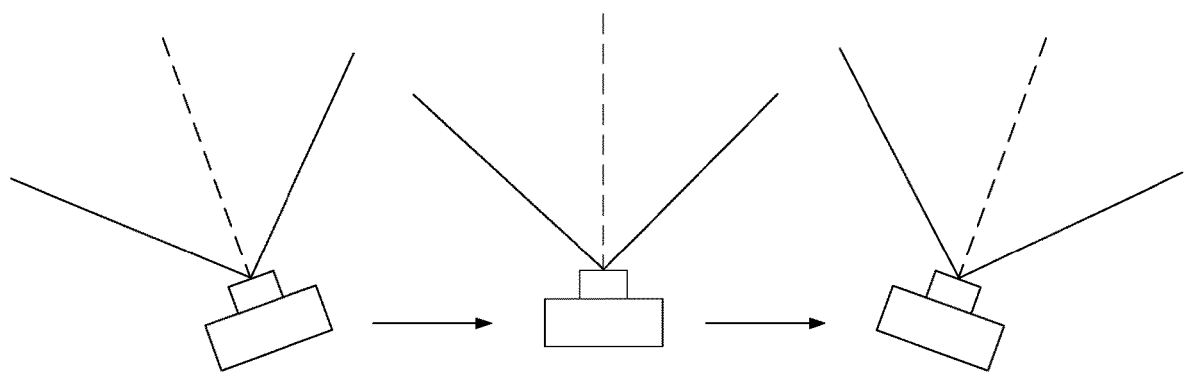
FIG. 5 is a schematic diagram of converting an angle of view according to some exemplary embodiments of the present disclosure.

Specifically, FIG. 5 may be taken as an example for illustrative purposes, which is a schematic diagram of converting an angle of view according to some exemplary embodiments of the present disclosure. Assuming that the preset trajectory is a straight line in a horizontal direction, an angle to be converted in the horizontal direction for each of the plurality of frames of images may be determined; assuming that the preset trajectory is a straight line perpendicular to the horizontal direction, an angle to be converted in perpendicular to the horizontal direction for each of the plurality of frames of images may be determined; assuming that the preset trajectory is a straight line in a diagonal direction of an image frame as shown in FIG. 4a, an angle to be converted in the diagonal direction for each of the plurality of frames of images may be determined. In some exemplary embodiments of the present disclosure, it may be determined, based on a preset trajectory, the conversion angle corresponding to each of a plurality of frames of images, without limiting the shape and representation of the preset trajectory.

For example, a plurality of frames of images may include 100 images, a preset trajectory may be a straight line in a horizontal direction, and a rotation angle range corresponding to the preset trajectory may be obtained, for example, with respect to an optical axis of a photographing apparatus, the angle may be rotated from −10 degrees to 10 degrees in the horizontal direction, so that the plurality of frames of images may be converted with a step length of 0.2 degrees, that is, the conversion angles corresponding to the plurality of frames of images may be −10 degrees, −9.8 degrees, . . . , −0.2 degrees, 0 degrees, 0.2 degrees, . . . , 9.8 degrees, 10 degrees.

Figure 6A:
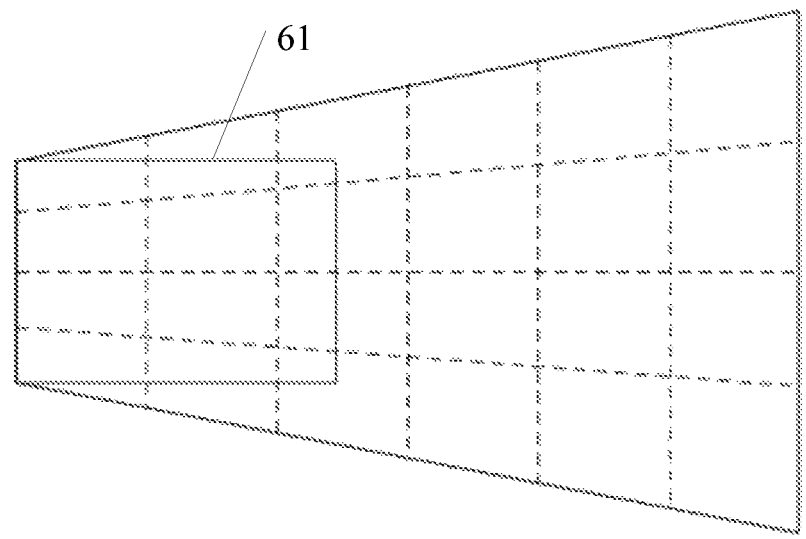
FIG. 6a is a schematic diagram of cropping a converted image according to some exemplary embodiments of the present disclosure.
Figure 6B:
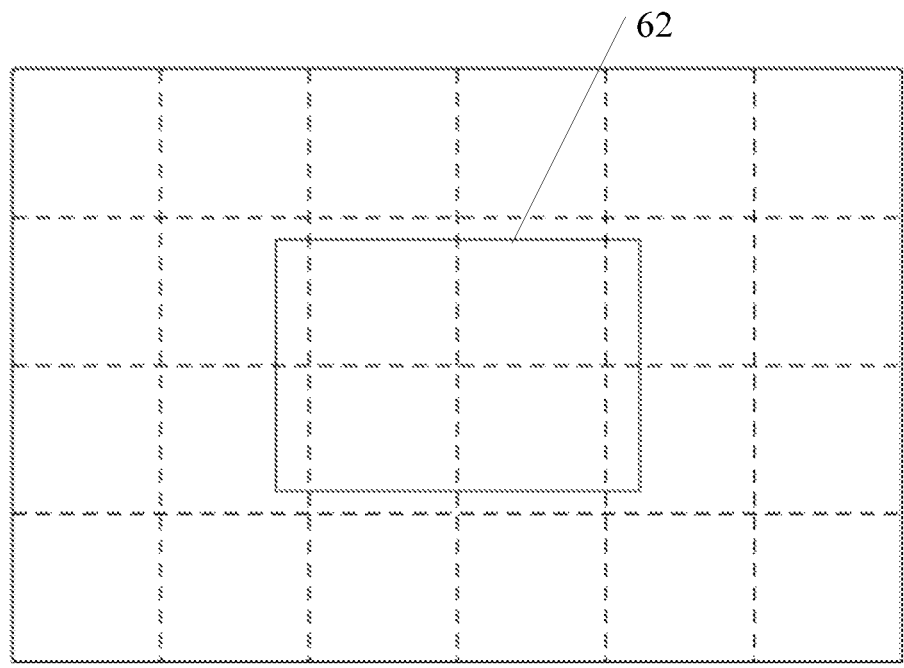
FIG. 6b is a schematic diagram of cropping a converted image according to some exemplary embodiments of the present disclosure.
Figure 6C:
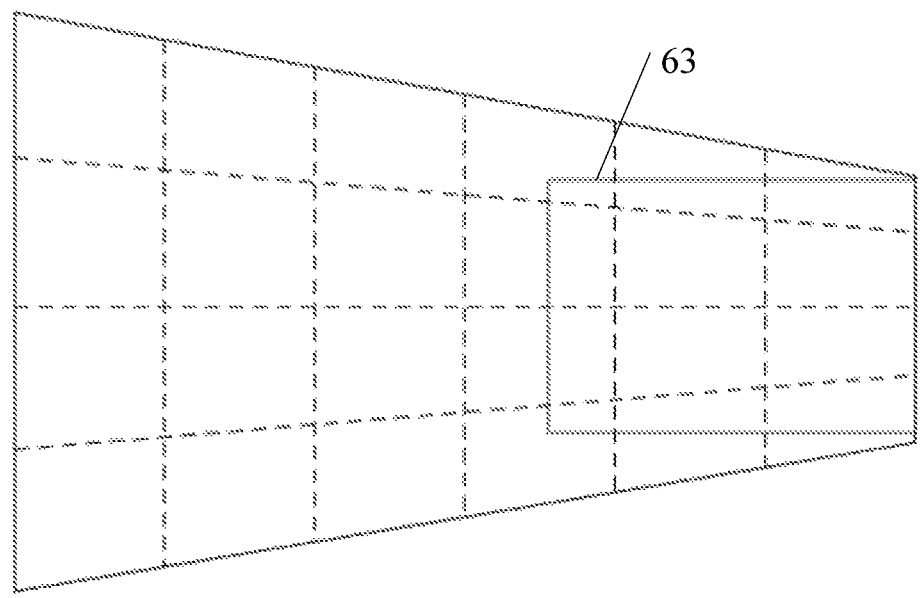
FIG. 6c is a schematic diagram of cropping a converted image according to some exemplary embodiments of the present disclosure.

Taking a first frame, a 50th frame and a 100th frame as examples, for the first frame, the angle of view may be rotated to −10 degrees, and the converted image is further cropped, the region 61 shown in FIG. 6a is the cropped image, where FIG. 6a is a schematic diagram of cropping this converted image provided in some exemplary embodiments of the present disclosure; for the 50th frame, the angle of view may be rotated by 0 degrees, that is, it is directly cropped without converting the angle of view, the region 62 shown in FIG. 6b is the cropped image, where FIG. 6b is a schematic diagram of cropping this converted image provided in some exemplary embodiments of the present disclosure; for the 100th frame, the angle of view may be rotated to 10 degrees, and the converted image is then cropped, the region 63 shown in FIG. 6c is the cropped image, where FIG. 6c is a schematic diagram of cropping this converted image provided in some exemplary embodiments of the present disclosure.

In some exemplary embodiments, when converting the fixed angle of view based on a conversion angle, an image processing device may determine, based on the conversion angle, a rotation matrix corresponding to each frame of image, and may convert the fixed angle of view based on the rotation matrix.

The process of converting the fixed angles of view based on the rotation matrix may be based on following formula:

$$\begin{bmatrix} u' \\ v' \\ 1 \end{bmatrix} \sim KR_t K^{-1} \begin{bmatrix} u \\ v \\ 1 \end{bmatrix}$$

where (u, v) are the coordinates of each pixel in the frames of images before the respective angle of view is converted, (u', v') are the coordinates of each pixel in the frames of images after the respective angle of view is converted, $R_t$ is a rotation matrix corresponding to an image frame determined according to the conversion angle, K is an internal parameter matrix of a photographing apparatus, the internal parameter matrix is determined according to a plurality of internal parameters, the internal parameters herein include a focal length, an image principal point coordinates and so on, which are obtained by pre-calibration of the photographing apparatus.

By determining a rotation matrix corresponding to each frame of image, and converting the fixed angle of view based on the rotation matrix, it may be more effectively simulates the shooting effect of angle conversion of the photographing apparatus, thereby improving the quality and stability of a target video.

In some exemplary embodiments, before cropping the plurality of frames of images in the initial video, an image processing device may further extract a plurality of frames of images from all frames of images of the initial video. For example, assuming that the initial video shot at a fixed angle of view is a 5 s video, the frame rate is 60 frames per second, and there are a total of 300 frames of images, the initial video may be compressed into a 2.5-second time-lapse video, in this way, 150 frames of images need to be extracted from the 300 frames of images.

For example, the extraction method of extracting a few frames of images from all frames of images of the initial video may be to obtain an image by every other frame, and then convert and crop the obtained image(s), for example, to extract a plurality of frames of images, including the first frame, the 3rd frame, the 5th frame, etc.

In some exemplary embodiments, an image processing device may select the corresponding image frame for conversion and cropping after obtaining all the frames of images in the initial video.

In some exemplary embodiments, an image processing device may convert and crop the frames that need to be extracted when capturing them. In this way, image capture and image processing may be performed synchronously, which may save time.

In some exemplary embodiments, when extracting the frames of images from all frames of images in the initial video, an image processing device may extract, based on duration of the initial video and target duration of a target video, the frames of images from all the frames of images of the initial video.

In some exemplary embodiments, an image processing device may extract, based on duration of the initial video and target duration of a target video, the frames of images from all the frames of images of the initial video. In some exemplary embodiments, the method of extracting a plurality frames of images from an image processing device is not limited herein.

For example, assuming that the duration of the initial video is 10 s, the target duration of the target video is 5 s, the ratio of the duration of the initial video to the target duration of the target video may be determined as 10:5, that is, 2:1. If the initial video includes 100 frames of images, an image processing device may extract, based on the ratio of 2:1 of the duration of the initial video to the target duration of the target video, 50 frames of images from the 100 frames of images of the initial video. In some exemplary embodiments, an image processing device may extract 50 frames of images arbitrarily from the 100 frames of images. In some exemplary embodiments, an image processing device may extract every other frame of image from the 100 frames of images to obtain 50 frames of images.

In some exemplary embodiments, an image processing device may determine, based on duration of the initial video and a target duration of a target video, the extraction time interval, and may extract, based on the extraction time interval, the plurality of frames of images from all the frames of images of the initial video.

For example, assuming that the initial video includes 100 frames of images, the duration of the initial video is 10 s, that is, the photographing apparatus may capture one image frame every 0.1 s, if the target duration of the target video is 5 s, the target video may include 50 frames of images. In this case, the extraction time interval may be determined as 0.2 s, that is, an image processing device may extract one frame of image taken by the photographing apparatus every 0.2 s, and may extract 50 frames of images from the 100 frames of images.

In some other exemplary embodiments, an image processing device may extract, based on a preset extraction time interval or a preset extraction image frame interval, the plurality of frames of images from all the frames of images of the initial video. The method of extracting a plurality of frames of images is not limited herein.

In some exemplary embodiments, before cropping the plurality of frames of images in the initial video, an image processing device may further perform a distortion removal on the plurality of frames of images in the initial video. For example, image distortion may be corrected by using certain distortion parameters. By performing a distortion removal on the plurality of frames of images, the quality of the target video may be improved.

In some exemplary embodiments, an image processing device may first perform a distortion removal on a plurality of frames of images, and then convert the de-distorted plurality of frames of images to the corresponding angle of view. In some exemplary embodiments, an image processing device may first perform a conversion of an angle of view, and then perform a distortion removal on the converted plurality of frames of images. In some exemplary embodiments, an image processing device may perform a conversion of an angle of view and a distortion removal on a plurality of frames of images simultaneously.

S203: Combine the cropped plurality of frames of images to obtain a target video.

In some exemplary embodiments of the present disclosure, an image processing device may combine the cropped plurality of frames of images to obtain a target video. In some exemplary embodiments, an image processing device may store or sequentially play the cropped plurality of frames of images.

In some exemplary embodiments of the present disclosure, an image processing device may obtain an initial video shot by a photographing apparatus at a fixed angle of view, where the initial video may include a plurality of frames of images, and may crop, based on a preset trajectory, the plurality of frames of images in the initial video, so as to combine the cropped plurality of frames of images to obtain a target video. Through the present embodiments, a target video with a smoothly moving field of view along a preset trajectory may be obtained from an initial video shot at a fixed angle of view, thereby improving a user's shooting experience.

Figure 7:
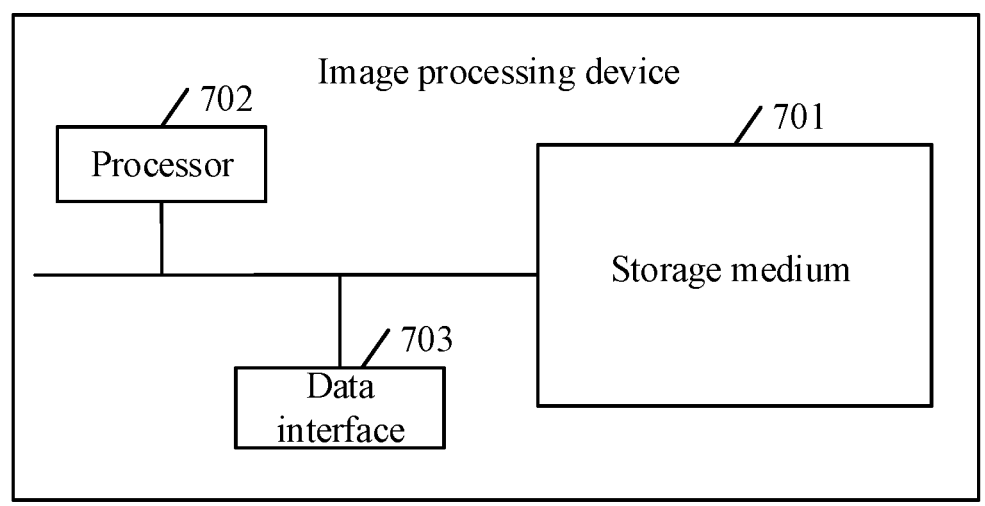
FIG. 7 is a schematic structural diagram of an image processing device.

Referring to FIG. 7, which is a schematic structural diagram of an image processing device provided by some exemplary embodiments of the present disclosure. Specifically, the image processing device may include at least one storage medium 701 and at least one processor 702.

In some exemplary embodiments, the image processing device may further include a data interface 703, which is used to transfer data information between the image processing device and other devices.

The storage medium 701 may include a volatile memory; the storage medium 701 may further include a non-volatile memory; the storage medium 701 may further include a combination of the foregoing types of storage media. The processor 702 may be a central processing unit (CPU). The processor 702 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), or a combination thereof.

The storage medium 701 may be configured to store a set of programs, and the processor 702 may call the programs stored in the storage medium 701 to perform the following steps:
   obtain an initial video shot by a photographing apparatus at a fixed angle of view, where the initial video may include a plurality of frames of images;
   crop, based on a preset trajectory, the plurality of frames of images in the initial video; and
   combine the cropped plurality of frames of images to obtain a target video.

Further, prior to cropping, based on the preset trajectory, the plurality of frames of images, the processor 702 may execute the set of instructions to:
   convert the fixed angle of view based on the preset trajectory, to obtain a plurality of frames of images after conversion; and
   the cropping, based on a preset trajectory, of the plurality of frames of images may include:
   crop, based on a preset trajectory, the converted plurality of frames of images.

Further, an angle of view corresponding to each of the plurality of frames of images following the conversion of an angle of view may be different.

Further, when converting the fixed angle of view based on the preset trajectory, the processor 702 may execute the set of instructions to:
   determine, based on the preset trajectory, respective conversion angles corresponding to the plurality of frames of images; and
   convert the fixed angle of view based on the conversion angles.

Further, when converting the fixed angle of view based on the preset trajectory, the processor 702 may execute the set of instructions to:
   determine, based on the conversion angle, a rotation matrix corresponding to each image frame; and
   convert the fixed angle of view based on the rotation matrix.

Further, the preset trajectory may include at least one of a straight line, a curved line, and marked dots.

Further, prior to cropping the plurality of frames of images in the initial video, the processor 702 may further execute the set of instructions to:
   extract a plurality of frames of images from all frames of images of the initial video.

Further, when extracting the plurality of frames of images from all the frames of images of the initial video, the processor 702 may execute the set of instructions to:
   extract, based on a duration of the initial video and a target duration of a target video, a plurality of frames of images from all the frames of images of the initial video.

Further, before cropping the plurality of frames of images in the initial video, the processor 702 may further execute the set of instructions to:
   perform distortion removal on the plurality of frames of images in the initial video.

In some exemplary embodiments of the present disclosure, an image processing device may obtain an initial video shot by a photographing apparatus at a fixed angle of view, where the initial video may include a plurality of frames of images, and may crop, based on a preset trajectory, the plurality of frames of images in the initial video, and then combine the cropped plurality of frames of images to obtain a target video. In this way, a target video with a smoothly moving field of view along a preset trajectory may be obtained from an initial video shot at a fixed angle of view, thereby improving a user's shooting experience.

Some exemplary embodiments of the present disclosure further provide an imaging system that includes a photographing apparatus and the image processing device. Some exemplary embodiments of the present disclosure may obtain an initial video shot by a photographing apparatus at a fixed angle of view, where the initial video may include a plurality of frames of images, and may crop, based on a preset trajectory, the plurality of frames of images in the initial video, and then combine the cropped plurality of frames of images to obtain a target video. In this way, a target video with a smoothly moving field of view along a preset trajectory may be obtained from an initial video shot at a fixed angle of view, thereby improving a user's shooting experience.

Some exemplary embodiments of the present disclosure further provide a computer readable storage medium storing a set of instructions, when a processor executes the set of instructions, the method of the exemplary embodiments shown in FIG. 2 of the present disclosure may be implemented, and the device of the exemplary embodiments shown in FIG. 7 of the present disclosure may be achieved. The details are not repeated herein.

The computer readable storage medium may be an internal storage unit of the device described in any of the foregoing exemplary embodiments, such as a hard disk or a memory of the device. The computer readable storage medium may also be an external storage device, such as a plug-in hard disk, a smart media card (SMC), a secure digital (SD) card, a flash card, or the like provided to the device. Further, the computer readable storage medium may further include an internal storage unit and an external storage device. The computer readable storage medium may be configured to store the computer programs and other programs and data required by a terminal. The computer readable storage medium may be further configured to temporarily store data that has been output or will be output.

What is disclosed above is merely some exemplary embodiments of the present disclosure, and is certainly not intended to limit the scope of protection of the present disclosure. Any modifications or replacements and the like within the technical scope of the present disclosure shall fall within the scope of protection of the present disclosure.

What is claimed is:

1. An image processing method, comprising:
   obtaining an initial video including a plurality of frames of images shot by a photographing apparatus at a fixed angle of view;
   converting and cropping, based on a trajectory of the photographing apparatus and the fixed angle of view to obtain a plurality of processed images; and
   obtaining a target video simulating a shooting effect of the photographing apparatus on the trajectory based on the plurality of processed images, wherein the trajectory is configured to indicate at least one angle of view different from the fixed angle of view, and the at least one angle of view is obtained by converting the fixed angle of view at a same fixed position.

2. The method according to claim 1, wherein the initial video is shot from a fixed angle of view;
   the method further comprising: prior to the cropping of the plurality of frames of images, converting the fixed angle of view based on the trajectory to obtain a plurality of frames of converted images; and
   the cropping of the plurality of frames of images includes: cropping, based on the trajectory, the plurality of frames of converted images.

3. The method according to claim 2, wherein for each of the plurality of frames of images, the converting changes the fixed angle of view.

4. The method according to claim 2, wherein the converting of the fixed angle of view based on the trajectory includes: for each of the plurality of frames of images, determining, based on the trajectory, a conversion angle; and
   converting the fixed angle of view based on the conversion angle.

5. The method according to claim 4, wherein the converting of the fixed angle of view based on the conversion angle includes: for each of the plurality of frames of images:
   determining, based on the conversion angle, a rotation matrix; and
   converting the fixed angle of view based on the rotation matrix.

6. The method according to claim 1, wherein the trajectory includes at least one of a straight line, a curved line, or marked dots.

7. The method according to claim 1, further comprising: prior to cropping the plurality of frames of images, performing at least one of:
   extracting at least one frame of image from the plurality of frames of images; or
   performing distortion removal on the plurality of frames of images.

8. The method according to claim 7, wherein the extracting of the at least one frame of image from the plurality of frames of images includes:
   extracting, based on a duration of the initial video and a target duration of a target video, the at least one frame of image from the plurality of frames of images.

9. An image processing device, comprising:
   at least one storage medium storing a set of instructions for image processing; and
   at least one processor in communication with the at least one storage medium, wherein during operation, the at least one processor executes the set of instructions to:
   convert and crop, based on a trajectory of the photographing apparatus and the fixed angle of view to obtain a plurality of processed images, and
   obtain a target video simulating a shooting effect of the photographing apparatus on the trajectory based on the plurality of processed images, wherein the trajectory is configured to indicate at least one angle of view different from the fixed angle of view, and the at least one angle of view is obtained by converting the fixed angle of view at a same fixed position.

10. The device according to claim 9, wherein the initial video is shot from a fixed angle of view, the at least one processor further executes the set of instructions to:
    convert the fixed angle of view based on the trajectory to obtain a plurality of frames of converted images before the cropping of the plurality of frames of images; and
    to crop the plurality of frames of images, the at least one processor executes the set of instructions to: crop, based on the trajectory, the plurality of frames of converted images.

11. The device according to claim 10, wherein for each of the plurality of frames of images, the at least one processor executes the set of instructions to convert the fixed angle of view to a different angle of view.

12. The device according to claim 10, wherein to convert the fixed angle of view based on the trajectory, the at least one processor executes the set of instructions to, for each of the plurality of frames of images:
    determine, based on the trajectory, a conversion angle; and
    convert the fixed angle of view based on the conversion angle.

13. The device according to claim 12, wherein to convert the fixed angle of view based on the trajectory, the at least one processor executes the set of instructions to, for each of the plurality of frames of images:
    determine, based on the conversion angle, a rotation matrix; and
    convert the fixed angle of view based on the rotation matrix.

14. The device according to claim 9, wherein
    the trajectory includes at least one of a straight line, a curved line, or marked dots.

15. The device according to claim 9, wherein the at least one processor further executes the set of instructions to:
    extract at least one frame of image from the plurality of frames of images, and then crop the plurality of frames of images.

16. The device according to claim 15, wherein to extract the at least one frame of image from the plurality of frames of images, the at least one processor executes the set of instructions to:
    extract, based on a duration of the initial video and a target duration of a target video, the at least one frame of image from the plurality of frames of images.

17. The device according to claim 9, wherein the at least one processor further executes the set of instructions to:
    perform distortion removal on the plurality of frames of images, and then crop the plurality of frames of images.

18. An imaging system, comprising:
a photographing apparatus; and
an image processing device, including:
   at least one storage medium storing a set of instructions for image processing, and
   at least one processor in communication with the at least one storage medium, wherein during operation, the at least one processor executes the set of instructions to:
     convert and crop, based on a trajectory of the photographing apparatus and the fixed angle of view to obtain a plurality of processed images, and
     obtain a target video simulating a shooting effect of the photographing apparatus on the trajectory based on the plurality of processed images, wherein the trajectory is configured to indicate at least one angle of view different from the fixed angle of view, and the at least one angle of view is obtained by converting the fixed angle of view at a same fixed position.

19. A non-transitory computer readable storage medium, comprising a set of instructions for image processing, wherein when being executed by at least one processor, the set of instructions direct the at least one processor to perform:
   convert and crop, based on a trajectory of the photographing apparatus and the fixed angle of view to obtain a plurality of processed images, and
   obtain a target video simulating a shooting effect of the photographing apparatus on the trajectory based on the plurality of processed images, wherein the trajectory is configured to indicate at least one angle of view different from the fixed angle of view, and the at least one angle of view is obtained by converting the fixed angle of view at a same fixed position.

20. The method according to claim 5, wherein the determining of the rotation matrix is based on:

$$\begin{bmatrix} u' \\ v' \\ 1 \end{bmatrix} \sim K R_t K^{-1} \begin{bmatrix} u \\ v \\ 1 \end{bmatrix}$$

where (u, v) are coordinates of each pixel in the plurality of frames of images before converting the fixed angle of view, (u', v') are coordinates of each pixel in the plurality of frames of converted images following converting the fixed angle of view, $R_t$ is a rotation matrix corresponding to an image frame determined according to the conversion angle, and K is an internal parameter matrix of the photographing apparatus.

* * * * *